(12) United States Patent
Chen et al.

(10) Patent No.: US 8,943,649 B2
(45) Date of Patent: Feb. 3, 2015

(54) HINGE AND FOLDABLE ELECTRONIC APPARATUS THEREWITH

(71) Applicant: Wistron Corporation, New Taipei (TW)

(72) Inventors: Yuan-Tai Chen, New Taipei (TW); Shao-Huai Tsai, New Taipei (TW); Kai-Yu Chu, New Taipei (TW); Yu-Han Tsai, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 0 days.

(21) Appl. No.: 13/949,253

(22) Filed: Jul. 24, 2013

(65) Prior Publication Data
US 2014/0376180 A1 Dec. 25, 2014

(30) Foreign Application Priority Data
Jun. 25, 2013 (TW) ............... 102122558 A (51) Int. Cl.
*E05D 11/10* (2006.01)
*E05D 7/00* (2006.01)
*G06F 1/16* (2006.01)

(52) U.S. Cl.
CPC ............... *E05D 7/00* (2013.01); *G06F 1/1681* (2013.01)
USPC .................. 16/320; 16/340; 16/342

(58) Field of Classification Search
USPC ........... 16/320, 385, 386, 342, 337, 338, 340, 16/DIG. 14; 292/251.5, 288, 338, 339, 292/342, 343, DIG. 17; 455/550.1, 557.1, 455/575.3; 379/433.13
See application file for complete search history.

(56) References Cited

U.S. PATENT DOCUMENTS

| | | | | |
|---|---|---|---|---|
| 3,287,760 | A * | 11/1966 | Moore | 16/265 |
| 8,413,302 | B2 | 4/2013 | Kitagawa | |
| 2002/0147026 | A1 * | 10/2002 | Hsieh | 455/550 |
| 2003/0154571 | A1 * | 8/2003 | Hsiang et al. | 16/320 |
| 2007/0077972 | A1 * | 4/2007 | Tu et al. | 455/575.3 |
| 2007/0090706 | A1 * | 4/2007 | Davis et al. | 310/90.5 |
| 2009/0167472 | A1 * | 7/2009 | Lu | 335/287 |
| 2010/0058557 | A1 * | 3/2010 | Wang | 16/320 |
| 2010/0071157 | A1 * | 3/2010 | Wang | 16/297 |
| 2013/0175264 | A1 * | 7/2013 | Lin | 220/4.22 |
| 2014/0146484 | A1 * | 5/2014 | Chen | 361/728 |

FOREIGN PATENT DOCUMENTS

| | | | | |
|---|---|---|---|---|
| JP | 2005147323 | A | * | 6/2005 |
| JP | 2005147324 | A | * | 6/2005 |
| JP | 2006112523 | A | * | 4/2006 |
| KR | 2005092196 | A | * | 9/2005 |

* cited by examiner

*Primary Examiner* — Chuck Mah
(74) *Attorney, Agent, or Firm* — Winston Hsu; Scott Margo (57) ABSTRACT

A hinge includes a pivot, two connection members pivotally connected by the pivot, a first magnetic part connected to one of the connection members, a second magnetic part moveably disposed relative to the first magnetic part and kinetically connected to the other one of the connection members, and an adjustment part kinetically connected to the other connection member and urging against the adjustment part. The magnetic moment of the second magnetic part is opposite to that of the first magnetic part. When the two connection members rotate relatively, the other connection member drives the adjustment part and the second magnetic part to rotate relative to the first magnetic part, so as to produce a repulsive moment resisting the rotation and varies with the rotation. A foldable electronic apparatus has the hinge.

20 Claims, 9 Drawing Sheets

HINGE AND FOLDABLE ELECTRONIC APPARATUS THEREWITH

BACKGROUND OF THE INVENTION

1. Field of the Invention

The invention relates to a hinge and a foldable electronic apparatus, and especially relates to a hinge providing moment produced by magnetic interaction and a foldable electronic apparatus having the hinge.

2. Description of the Prior Art

Hinges used in conventional notebooks or foldable electronic products need to provide pivotal members and produce an enough moment for keeping the apparatus at a required unfolded state and avoiding damage on components of the apparatus due to sudden folding. Such hinge produces the moment usually produced by friction force when fixing supports of the hinge rotate relatively. In practice, the hinge provides required friction force by use of deformation of several stacked spring washers so as to produce the moment. In such configuration, in principle, once the hinge is assembled completely, the moment provided by the hinge is fixed. If an adjustment of the moment is required, for example for different products with different required moments, the hinge needs a redesign, for example by changing the disposition quantity or preliminary assembly deformation of spring washers. It is quite inconvenient. Furthermore, during operation of the hinge, it is difficult to avoid abrasion. After a long time use of the hinge, abrasion will make the friction decrease, leading to influence on the capability of producing moment by the hinge, even to a failure of the hinge. In addition, the moment provided by the hinge also is a resistance to unfolding or folding the apparatus by a user. In practice, the moment required for different stages of the folding of the apparatus is not constant. Because the hinge can provide a single moment only, the moment provided by the hinge is set to be larger than the maximum one of required moments, even over a certain value for compensation on the friction decrement due to abrasion. However, it induces inconvenience to unfolding or folding the apparatus by the user.

SUMMARY OF THE INVENTION

An objective of the invention is to provide a hinge, which uses magnetic interaction by magnetic parts so that when the magnetic parts rotate relatively, a repulsive moment resisting the rotation is produced and the repulsive moment can be changed by adjusting a distance of the magnetic parts.

The hinge of the invention includes a first connection member, a second connection member, a pivot, a first magnetic part, a second magnetic part, and an adjustment part. The first connection member and the second connection member are pivotally connected by the pivot. The first magnetic part is connected onto the first connection member. The first magnetic part produces a radial magnetic field relative to the pivot. The second magnetic part is moveably disposed relative to the first magnetic part and kinetically connected to the second connection member. A magnetic moment of the second magnetic part is opposite to a magnetic moment of the first magnetic part. The adjustment part is kinetically connected to the second connection member and capable of driving the second magnetic part. Therein, when the second connection member rotates relative to the first connection member, the second connection member drives the second magnetic part by the adjustment part to rotate relative to the first magnetic part, so that a repulsive moment is induced between the first magnetic part and the second magnetic part for resisting the rotating of the second connection member relative to the first connection member, and the second connection member also drives the adjustment part to adjust a distance between the second magnetic part and the first magnetic part so as to vary the repulsive moment.

Thereby, when the first connection member and the second connection member rotate relatively, the first magnetic part and the second magnetic part also rotate relatively. Because of the magnetic interaction between the first magnetic part and the second magnetic part, the repulsive moment is induced between the first magnetic part and the second magnetic part for resisting the rotation. The repulsive moment is inversely proportional to the distance between the second magnetic part and the first magnetic part; that is, the repulsive moment can be adjusted by adjusting the distance between the first magnetic part and the second magnetic part. Further, the hinge can use a guiding mechanism (for example a guiding slot and a guided rod sliding on the guiding slot) to guide the adjustment part to move in an axial direction of the pivot relative to the first magnetic part during the relative rotation of the first connection member and the second connection member, so that the repulsive moment varies with the relative rotation angle of the first connection member and the second connection member to provide variable repulsive moment output for satisfying different requirements to the hinge. In addition, the production of the repulsive moment is not based on friction force, so the problem in the prior art that the moment output weakens due to abrasion is absent. Therefore, the hinge of the invention can work normally over a quite long time.

Another objective of the invention is to provide a foldable electronic apparatus, which uses the hinge of the invention to pivotally connect two casings to effectively keep the apparatus at a required unfolded state and avoid damage on the casings due to a sudden folding of the apparatus.

The foldable electronic apparatus of the invention includes a first casing, a second casing, and a hinge. The first casing and the second casing are pivotally connected by the hinge. The hinge includes a first connection member, a second connection member, a pivot, a first magnetic part, a second magnetic part, and an adjustment part. The first connection member is connected to the first casing. The second connection member is connected to the second casing. The first connection member and the second connection member are pivotally connected by the pivot, so that the first casing and the second casing can rotate relatively to fold or unfold. The first magnetic part is connected onto the first connection member. The first magnetic part produces a radial magnetic field relative to the pivot. The second magnetic part is moveably disposed relative to the first magnetic part and kinetically connected to the second connection member. A magnetic moment of the second magnetic part is opposite to a magnetic moment of the first magnetic part. The adjustment part is kinetically connected to the second connection member and capable of driving the second magnetic part. Therein, when the second connection member rotates relative to the first connection member, the second connection member drives the second magnetic part by the adjustment part to rotate relative to the first magnetic part, so that a repulsive moment is induced between the first magnetic part and the second magnetic part for resisting the rotating of the second connection member relative to the first connection member, and the second connection member also drives the adjustment part to adjust a distance between the second magnetic part and the first magnetic part so as to vary the repulsive moment. Besides, when the first casing and the second casing rotate relatively from a folded state to unfold to an unfolded, the repulsive moment increases overall.

Similarly, when the first casing and the second casing rotate relatively, the first connection member and the second connection member rotate relatively so that the first magnetic part and the second magnetic part also rotate relatively. Because of the magnetic interaction between the first magnetic part and the second magnetic part, the repulsive moment is induced between the first magnetic part and the second magnetic part for resisting the rotation. Therefore, the repulsive moment can be used to keep the apparatus at a required unfolded state and avoid damage on the casings due to a sudden folding of the apparatus. The repulsive moment is inversely proportional to the distance between the second magnetic part and the first magnetic part; that is, the repulsive moment can be adjusted by adjusting the distance between the first magnetic part and the second magnetic part. In practice, the hinge can use a guiding mechanism (for example a guiding slot and a guided rod sliding on the guiding slot) to guide the adjustment part to move in an axial direction of the pivot relative to the first magnetic part during the relative rotation of the first connection member and the second connection member (for example by unfolding the first casing and the second casing by a user), so that the repulsive moment varies with the relative rotation angle of the first connection member and the second connection member so that during unfolding the foldable electronic apparatus, the hinge provides enough repulsive moment for keeping at the unfolded state without producing excessively large repulsive moment inducing to inconvenience to manipulation of the user.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
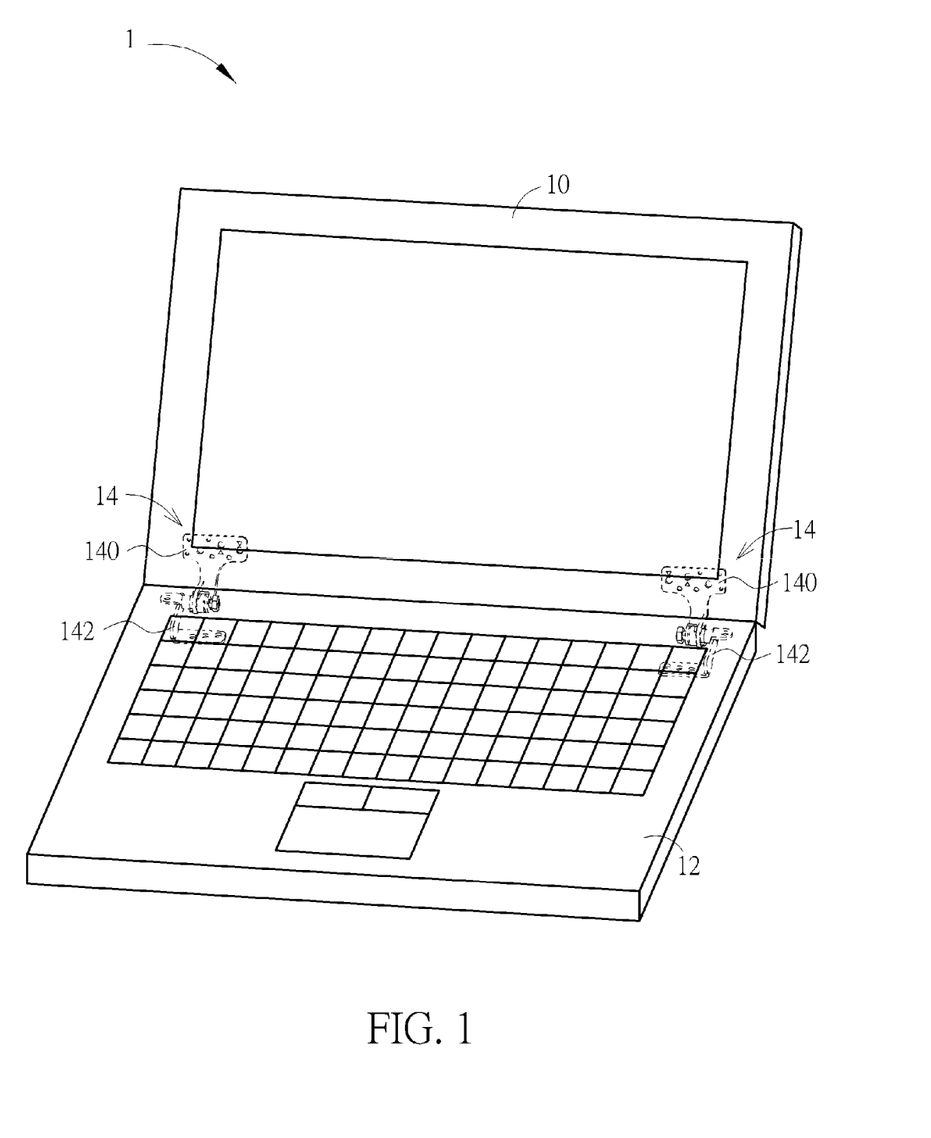
FIG. 1 is a schematic diagram illustrating a foldable electronic apparatus of a preferred embodiment according to the invention.

Please refer to FIG. 1, which is a schematic diagram illustrating a foldable electronic apparatus 1 of a preferred embodiment according to the invention. The foldable electronic apparatus 1 includes a first casing 10, a second casing 12, and two hinges 14. The first casing 10 and the second casing 12 are pivotally connected by these hinges 14 so as to be capable of rotating relatively to be folded or unfolded. In the embodiment, the foldable electronic apparatus 1 is a notebook. The first casing 10 is a monitor, and the second casing 12 is a system host; however, the invention is not limited thereto.

Figure 2:
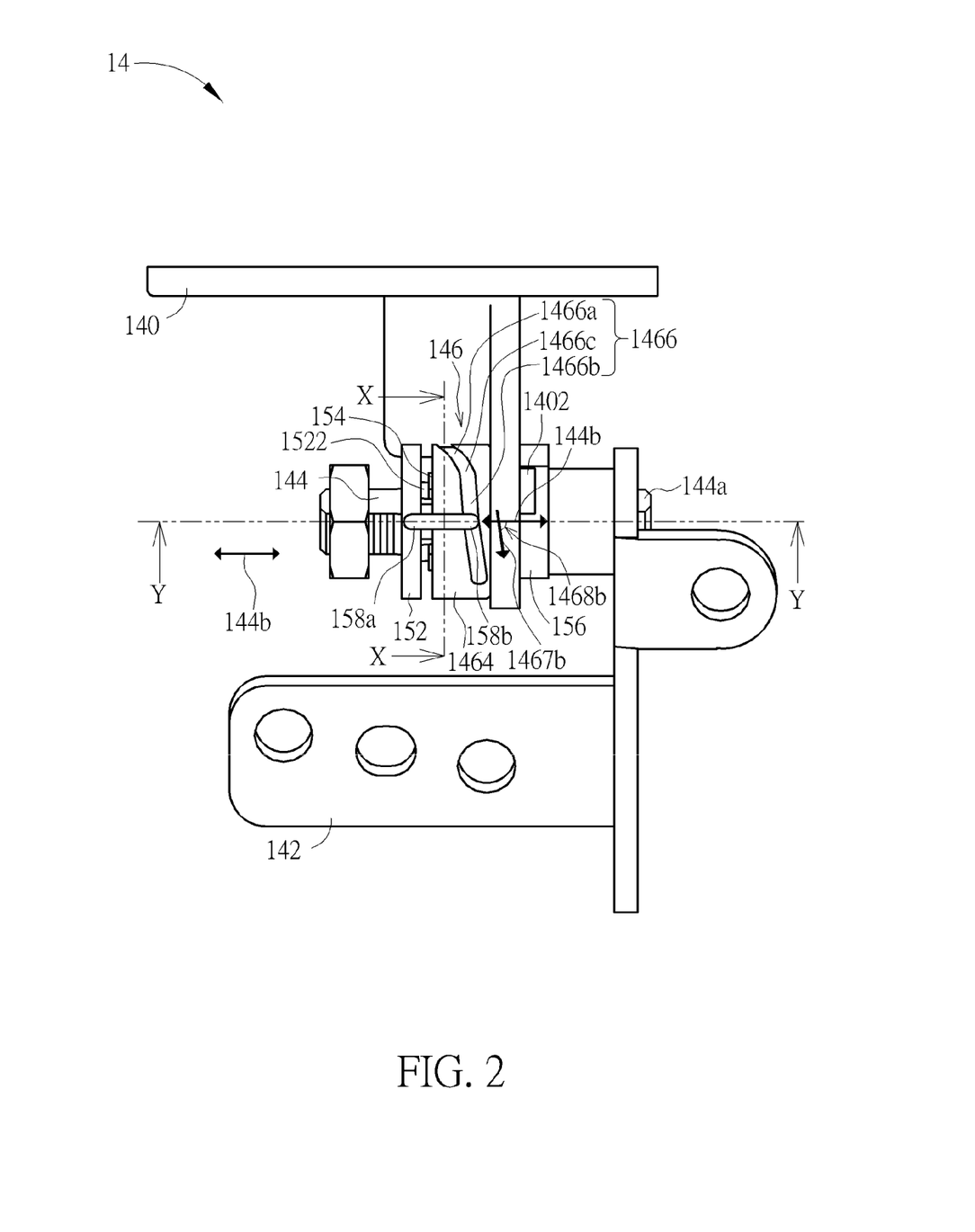
FIG. 2 is a schematic diagram illustrating a hinge of the foldable electronic apparatus in FIG. 1.
Figure 3:
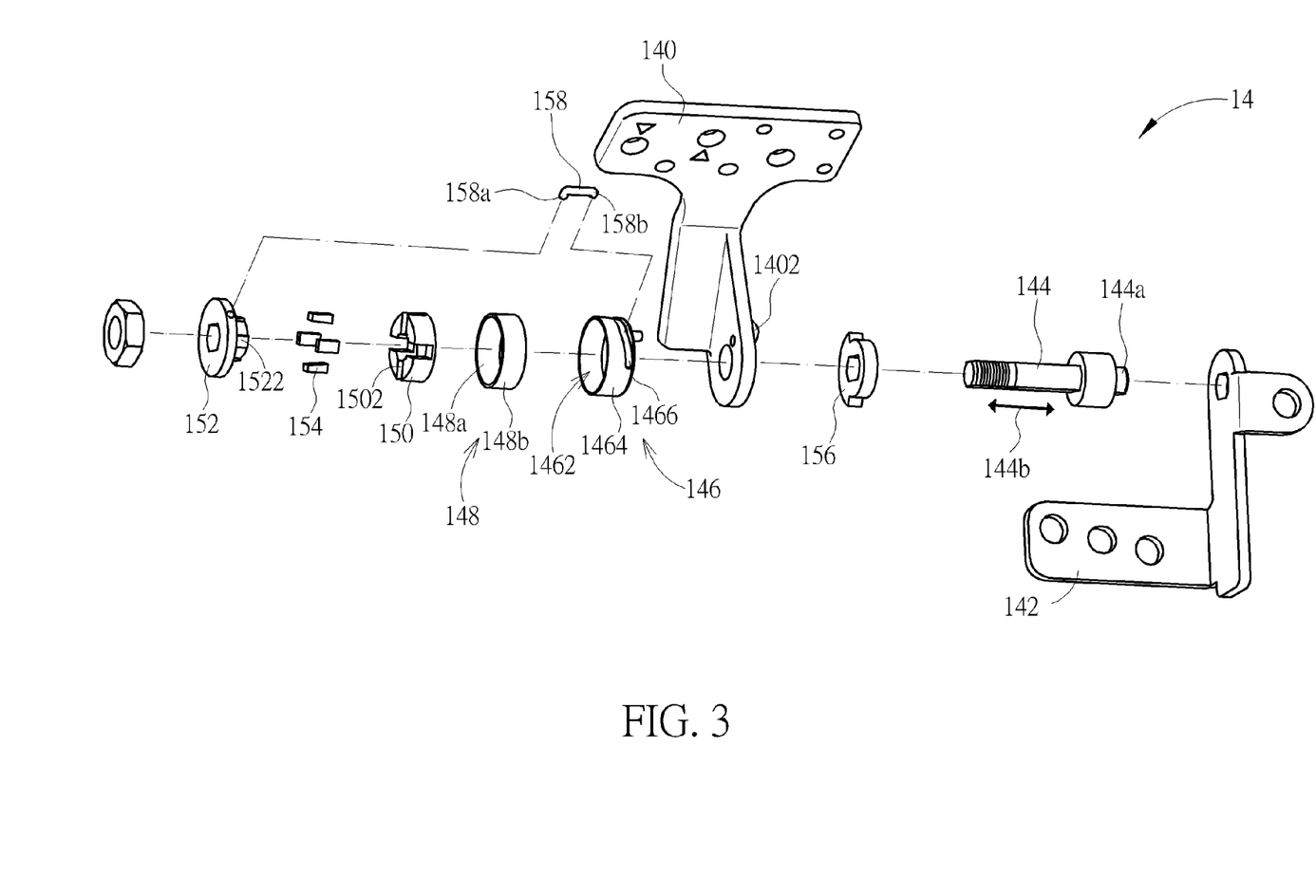
FIG. 3 is an exploded view of the hinge in FIG. 2.
Figure 4:
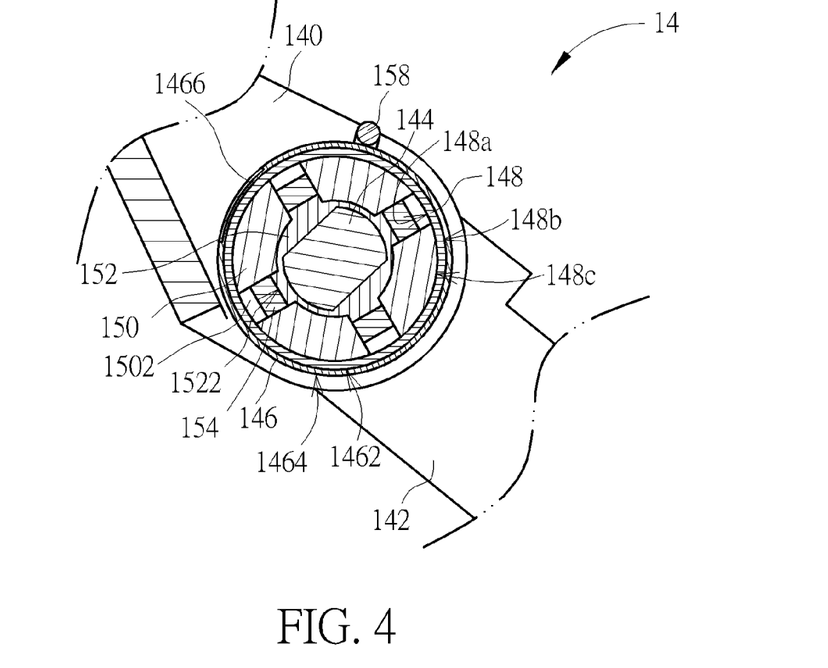
FIG. 4 is a sectional view of the hinge along the line X-X in FIG. 2.

Please also refer to FIGS. 2 through 4. FIG. 2 is a schematic diagram illustrating the hinge 14. FIG. 3 is an exploded view of the hinge 14. FIG. 4 is a sectional view of the hinge 14 along the line X-X in FIG. 2. The hinge 14 includes a first connection member 140, a second connection member 142, a pivot 144, a socket 146, a first magnetic part 148, a guiding part 150, an adjustment part 152, a plurality of second magnetic parts 154, and a limit part 156. The first connection member 140 is fixedly connected to the first casing 10. The second connection member 142 is fixedly connected to the second casing 12. The first connection member 140 and the second connection member 142 are pivotally connected by the pivot 144, so that the first casing 10 and the second casing 12 are capable of rotating relatively to be folded or unfolded. In the embodiment, the pivot 144 passes through the second connection member 142, the limit part 156, the first connection member 140, the socket 146, the first magnetic part 148, the guiding part 150, and the adjustment part 152. Therein, the second connection member 142 is sleeved on an end portion 144a of the pivot 144 by use of a non-circular connection sectional profile for achieving the purpose of connecting the second connection member 142 with the pivot 144 firmly, so that the second connection member 142 and the pivot 144 can move together. The limit part 156, the guiding part 150, and the adjustment part 152 are sleeved on the pivot 144 also by use of a non-circular connection sectional profile, so that the limit part 156, the guiding part 150, and the adjustment part 152 are kinetically connected to the second connection member 142 by the pivot 144 for achieving the purpose that the limit part 156, the guiding part 150, and the adjustment part 152 are capable of rotating together with the second connection member 142 and the pivot 144. Therein, the second magnetic part 154 is movably disposed relative to the first magnetic part 148 and kinetically connected to the second connection member 142. The second magnetic part 154 also can rotate together with them by structural constraint. The disposition of the second magnetic part 154 will be described later. The first connection member 140, the socket 146, and the first magnetic part 148 are directly sleeved on the pivot 144 by use of a circular connection sectional profile, so as to rotate independent to the pivot 144, that is, to rotate relative to the second connection member 142 and the second magnetic part 154. In the embodiment, the available angle range of the relative rotation of the first connection member 140 and the second connection member 142 depends on the structural interference of the limit part 156 with a limit pillar 1402 fixedly disposed on the first connection member 140.

Further, the socket 146 surrounds the pivot 144 and is fixedly connected onto the first connection member 140. The socket 146 has a recess 1462. The first magnetic part 148 is a ring part and is fixed on a sidewall of the recess 1462 for the purpose that the first magnetic part 148 surrounds the pivot 144 and is fixedly connected onto the first connection member 140. In practice, the first magnetic part 148 can be replaced with a plurality of magnetic parts disposed in a ring. The pole of the first magnetic part 148 is located on the inner ring surface 148a and the outer ring surface 148b of the first magnetic part 14 respectively. In other words, the magnetic moment of the first magnetic part 148 points toward or away from the axial direction 144b of the pivot 144 and is perpendicular to the axial direction 144b. The first magnetic part 148 and the pivot 144 form a movement space 148c therebetween. The movement space 148c surrounds the pivot 144, that is, the space between the inner ring surface 148a and the pivot 144. The first magnetic part 148 produces a radial magnetic field relative to the pivot 144 in the movement space 148c; therein, the direction of the magnetic field in the movement space 148c is substantially perpendicular to the axial direction 144b. The guiding part 150 is disposed in the movement space 148c and has four sliding slots 1502 extending in a direction perpendicular to the axial direction 144b relative to the pivot 144, i.e. radially extending. The adjustment part 152 is disposed in the movement space 148c to be moveable in the axial direction 144b relative to the first magnetic part 148. The second magnetic parts 154 are slidably disposed in the sliding slots 1502 correspondingly; that is, the second magnetic parts 154 are radially moveably disposed in the movement space 148c between the adjustment part 152 and the first magnetic part 148. The second magnetic part 154 is capable of rotating together with the second connection member 142 relative to first magnetic part 148 by use of the structural constraint by the guiding part 150. Therein, the polarity of the second magnetic part 154 opposite to the first magnetic part 148 is the same as the polarity of the first magnetic part 148 at the inner ring surface 148a, for example both being N poles or S poles. In other words, the magnetic moment (i.e. a vector pointing in the direction from the south pole to the north pole) of the second magnetic part 154 is opposite to the magnetic moment of the first magnetic part 148. Thereby, a radial repulsion force is induced between the second magnetic part 154 and the first magnetic part 148 so that the second magnetic part 154 can keep urging against the adjustment part 152.

Figure 5:
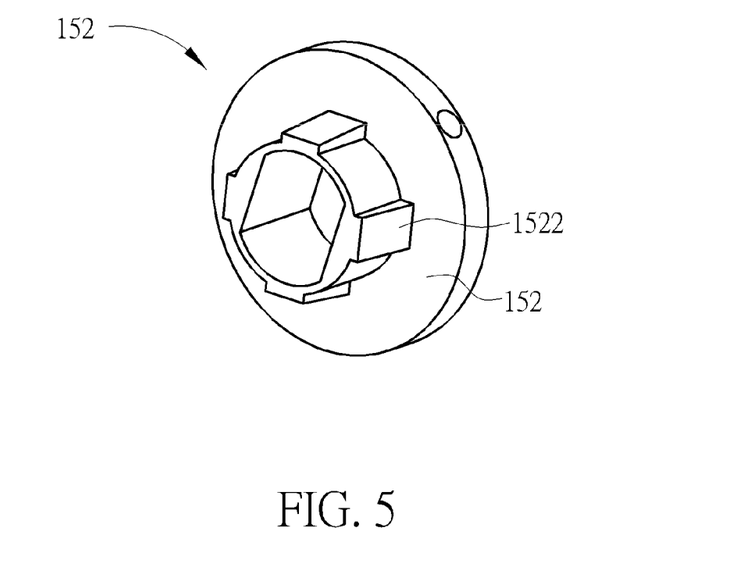
FIG. 5 is a schematic diagram illustrating an adjustment part of the hinge in FIG. 3 in another view point.
Figure 6:
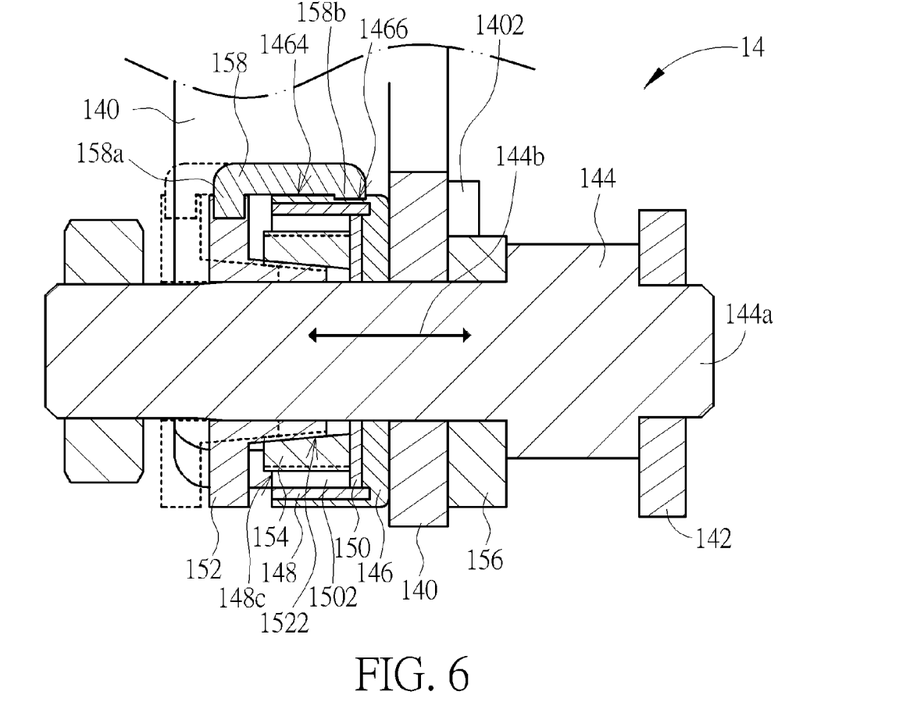
FIG. 6 is a sectional view of the hinge along the line Y-Y in FIG. 2.

Please refer to FIG. 5, which is a schematic diagram illustrating an adjustment part 152 in another view point. In the embodiment, the adjustment part 152 has four oblique surfaces 1522 corresponding to the second magnetic parts 154 and substantially extending in the axial direction 144b. The second magnetic part 154 urges against the corresponding oblique surface 1522. In the embodiment, the oblique surfaces 1522 are obtained by protrusive ribs of the adjustment part 152. The protrusive ribs extend into corresponding sliding slots 1502, so that when the second connection member 142 rotates relative to the first connection member 140, the second connection member 142 can also drive the second magnetic part 154 by the adjustment part 152 to rotate relative to the first magnetic part 148. Because of the structural constraint on the second magnetic part 154 by the corresponding oblique surface 1522 and the corresponding sliding slot 1502 and because of the interaction on the second magnetic part 154 by the radial repulsion force with the urging-against effect on the second magnetic part 154 by the adjustment part 152, when the adjustment part 152 moves in the axial direction 144b relative to the first magnetic part 148, the second magnetic part 154 slides on the corresponding oblique surface 1522 relative to the adjustment part 152 to radially move toward or away from the first magnetic part 148 so as to change the distance between the second magnetic part 154 and the corresponding first magnetic part 148, i.e. to change the radial repulsion force. Please refer to FIG. 6, which is a sectional view of the hinge 14 along the line Y-Y in FIG. 2. As shown in FIG. 6, the adjustment part 152 illustrated by solid lines is closer to the first magnetic part 148; the adjustment part 152 urges against the second magnetic parts 154 by the oblique surfaces 1522 so that the second magnetic parts 154 are closer to the first magnetic part 148. In this state, the radial repulsion force is relatively larger. Besides, As shown in FIG. 6, the adjustment part 152 illustrated by dashed lines is farther from the first magnetic part 148; the adjustment part 152 still urges against the second magnetic parts 154 so that the second magnetic parts 154 are farther from the first magnetic part 148. In this state, the radial repulsion force is relatively smaller. In the embodiment, the second magnetic part 154 is provided by a wedge structure, which is conducive to the preservation of the second magnetic parts 154 sliding relatively both in the sliding slots 1502 and on the oblique surfaces 1522 stably; however, the invention is not limited thereto.

Please refer to FIGS. 3, 4 and 6. It is additionally added that in the embodiment, the sliding direction of the second magnetic part 154 is limited mainly by the corresponding sliding slot 1502. In practice, the sliding slots 1502 maybe formed on the adjustment part 152 directly. The bottom surfaces of such sliding slots 1502 are taken as the oblique surfaces 1522. The bottom surfaces cooperates with the bottom surface of the recess 1462 of the socket 146 to constrain the second magnetic part 154 in the axial direction 144b, which also can make the second magnetic part 154 slide radially relative to the pivot 144 stably. In addition, in the embodiment, the hinge 14 uses the independent socket 146 to form the recess 1462 for fixing the first magnetic part 148 and providing the movement space 148c, but the invention is not limited thereto. For example, the first magnetic part 148 can be fixed directly onto the first connection member 140, or the first connection member 140 is provided with a structure, like the recess 1462, directly formed on the first connection member 140 in one piece.

Please refer to FIGS. 1, 4 and 6. When the first casing 10 and the second casing 12 rotate relatively, the first connection member 140 and the second connection member 142 rotate relatively so that the first magnetic part 148 and the second magnetic part 154 also rotate relatively. Because of the magnetic interaction between the first magnetic part 148 and the second magnetic part 154, the first magnetic part 148 and the second magnetic part 154 form a repulsive moment therebetween resisting the rotation of the second connection member 142 relative to the first connection member 140. The repulsive moment is used for keeping the foldable electronic apparatus 1 at a required unfolded state and avoiding damage on the casings due to a sudden folding of the first casing 10 and the second casing 12. The repulsive moment is proportional to the radial repulsion force. In other words, the repulsive moment can be adjusted by adjusting the distance between the first magnetic part 148 and the second magnetic part 154. For requirements of various products, the radial repulsion force can be designed to be constant or dynamically vary with the situations of unfolding the first casing 10 and the second casing 12.

Please refer back to FIG. 2 and FIG. 3. In the embodiment, the socket 146 has an outer circumferential surface 1464 and a guiding slot 1466 formed on the outer circumferential surface 1464. The guiding slot 1466 extends surrounding the axial direction 144b; that is, the guiding slot 1466 extends relative to the pivot 144 both in the axial direction 144b and the radial direction of the pivot 144. The hinge 14 also includes a guided rod 158. A first end 158a of the guided rod 158 is connected to the adjustment part 152; a second end 158b of the guided rod 158 is disposed to slide in the guiding slot 1466. Because the extending path of the guiding slot 1466 also varies in the axial direction 144b, when the second connection member 142 rotates relative to the first connection member 140, the second connection member 142 drives the adjustment part 152 to rotate relative to the socket 146; that is, the second connection member 142, the guiding part 150, the adjustment part 152, the second magnetic parts 154, and the guided rod 158 rotate together relative to the first connection member 140, the socket 146, and the first magnetic part 148. The second end 158b slides in the guiding slot 1466 to guide the adjustment part 152 to move in the axial direction 144b relative to the first magnetic part 148, so as to change the distance between the second magnetic part 154 and the first magnetic part 148. In other words, the magnitude of the radial repulsion force between the second magnetic part 154 and the first magnetic part 148 is therefore changed, and the magnitude of the repulsive moment is changed accordingly.

Figure 7:
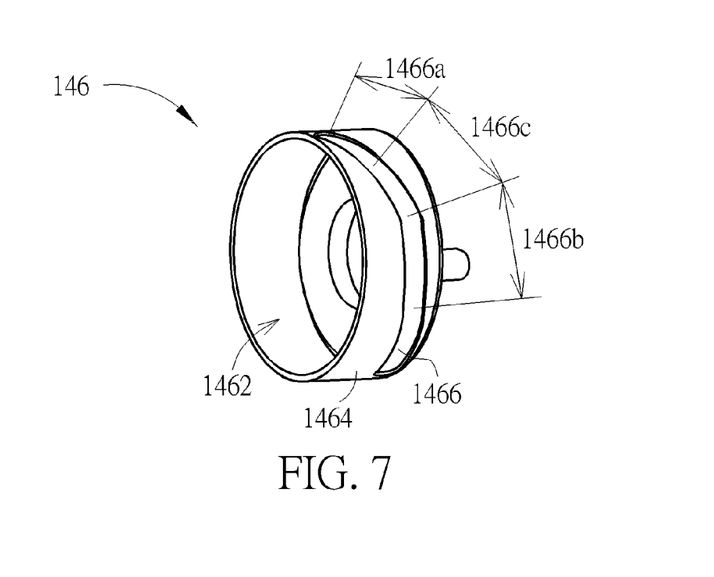
FIG. 7 is a schematic diagram illustrating a socket of the hinge in FIG. 3 in another view point.
Figure 8:
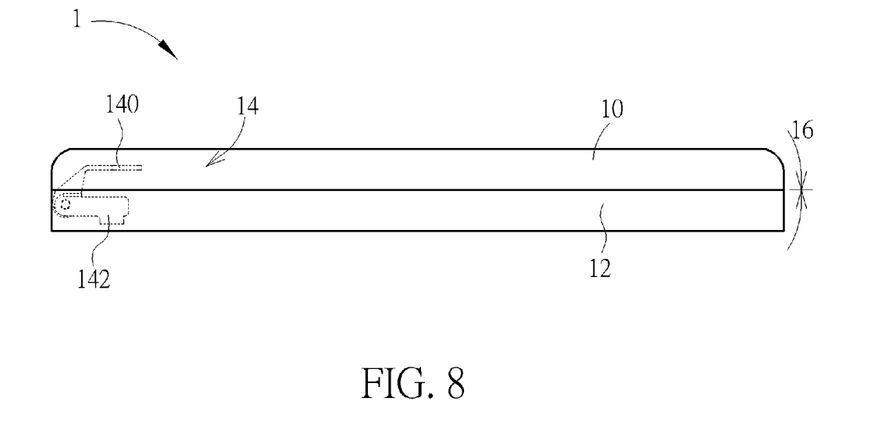
FIG. 8 is a schematic diagram illustrating the foldable electronic apparatus at a folded state.
Figure 9:
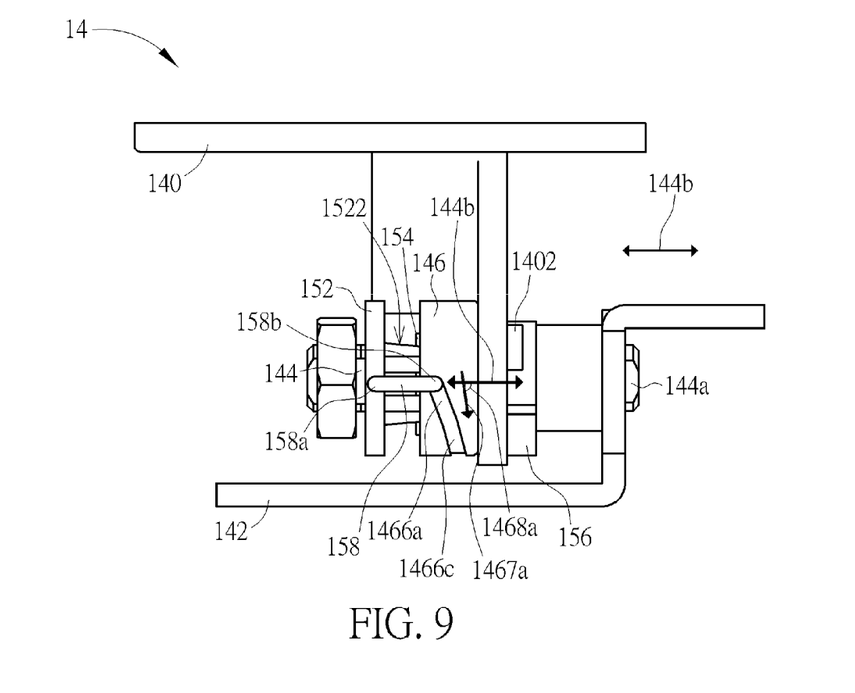
FIG. 9 is a schematic diagram illustrating the hinge in FIG. 8.

Please refer to FIGS. 7 through 9. FIG. 7 is a schematic diagram illustrating a socket 146. In the embodiment, the guiding slot 1466 has a first segment 1466a, a second segment 1466b, and a third segment 1466c. When the first casing 10 and the second casing 12 are at a folded state, the second end 158b of the guided rod 158 is located within the first segment 1466a. In this moment, the adjustment part 152 and the socket 146 (or the first magnetic part 148) are farther away from each other (as shown by FIG. 9). Based on the foregoing description about the action of the hinge 14 and FIG. 4 and FIG. 6, it is realized that in this moment, the distance between the second magnetic part 154 and the first magnetic part 148 is relatively larger; that is, the radial repulsion force between the second magnetic part 154 and the first magnetic part 148 is relatively smaller. So the repulsive moment for resisting rotation provided by the hinge 14 is also small. A user can unfold the first casing 10 and the second casing 12 easily. In this situation, the rotation angle 16 of the first casing 10 and the second casing 12 is defined to be 0 degree.

Figure 10:
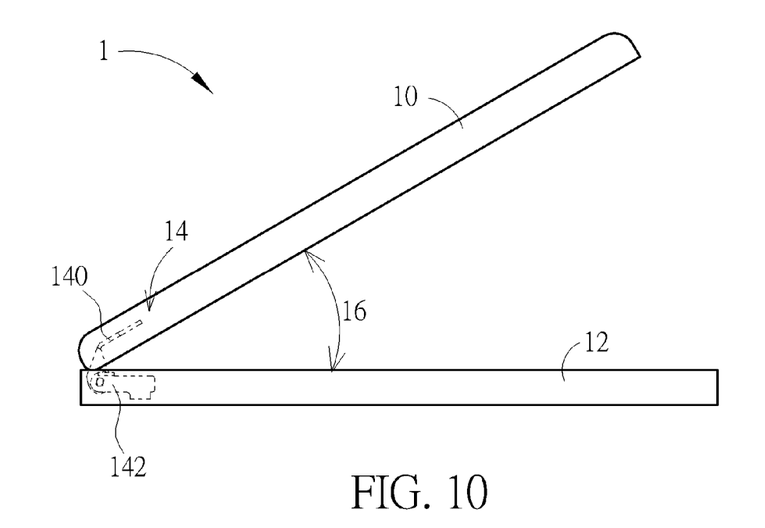
FIG. 10 is a schematic diagram illustrating the foldable electronic apparatus at a semi-unfolded state.
Figure 11:
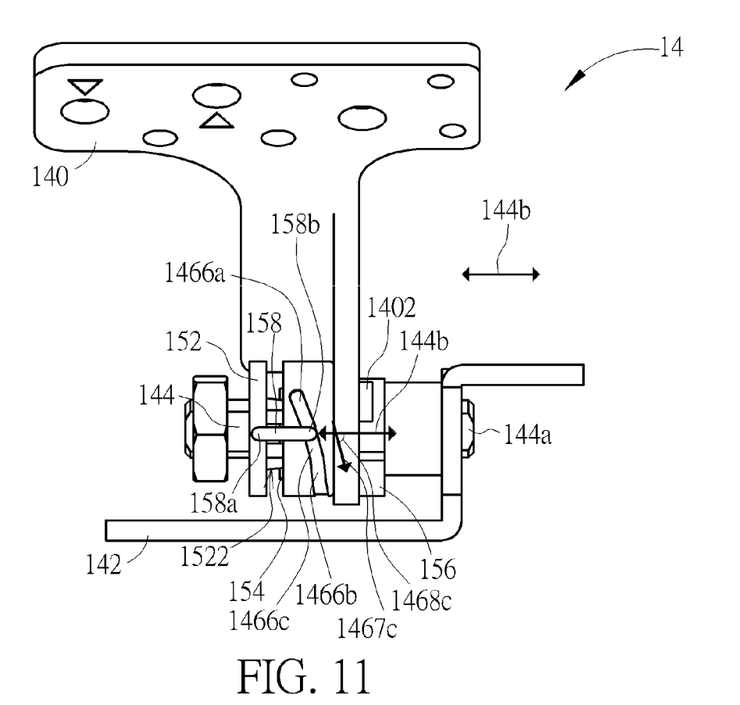
FIG. 11 is a schematic diagram illustrating the hinge in FIG. 10.

Please refer to FIGS. 7, 10 and 11. When the first casing 10 and the second casing 12 are unfolded to a semi-unfolded state, the second end 158b of the guided rod 158 is located within the third segment 1466c. In this moment, the distance between the adjustment part 152 and the socket 146 (or the first magnetic part 148) is smaller than that shown in FIG. 9. Similarly, the distance between the second magnetic part 154 and the first magnetic part 148 is also relatively smaller; that is, the radial repulsion force between the second magnetic part 154 and the first magnetic part 148 is relatively larger. So the repulsive moment for resisting rotation provided by hinge 14 is relatively larger, which is conducive to avoidance of damage caused by the first casing 10 falling by its weight to impact the second casing 12. In this situation, the rotation angle 16 of the first casing 10 and the second casing 12 can be designed to be from 30 to 90 degrees.

Figure 12:
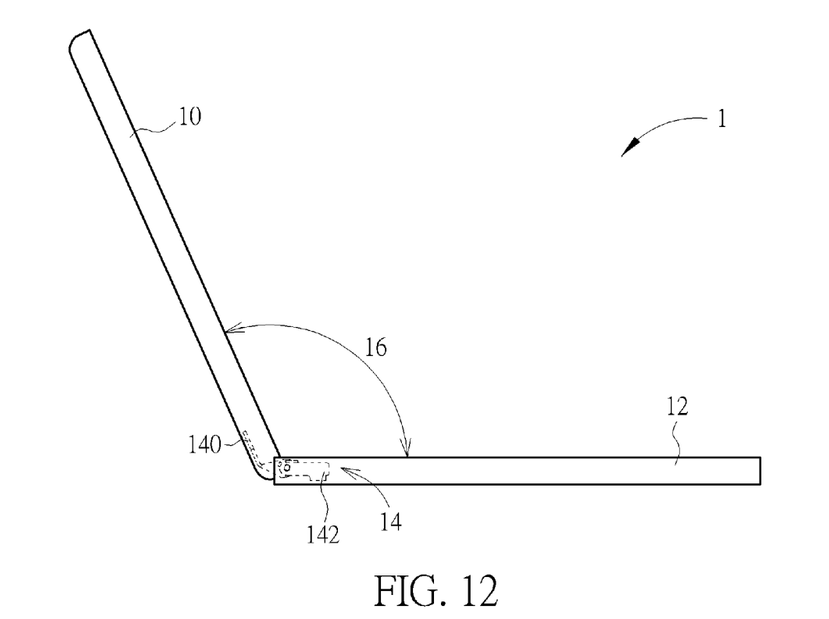
FIG. 12 is a schematic diagram illustrating the foldable electronic apparatus at an unfolded state.

Please refer to FIGS. 7, 11 and 12. When the first casing 10 and the second casing 12 are kept in being unfolded to an unfolded state, the second end 158b of the guided rod 158 is located within the second segment 1466b. In this moment, the distance between the adjustment part 152 and the socket 146 (or the first magnetic part 148) is much smaller (shown as FIG. 2) than that shown in FIG. 9. Similarly, the distance between the second magnetic part 154 and the first magnetic part 148 is also much smaller; that is, the radial repulsion force between the second magnetic part 154 and the first magnetic part 148 is much larger. So the repulsive moment for resisting rotation provided by the hinge 14 is also much larger, which is conducive to keeping the foldable electronic apparatus 1 at a required unfolded state and avoiding damage on the first casing 10 and the second casing 12 due to a sudden folding of the casings 12. In this situation, the rotation angle 16 of the first casing 10 and the second casing 12 can be designed to be from 90 to 135 degrees.

Figure 13:
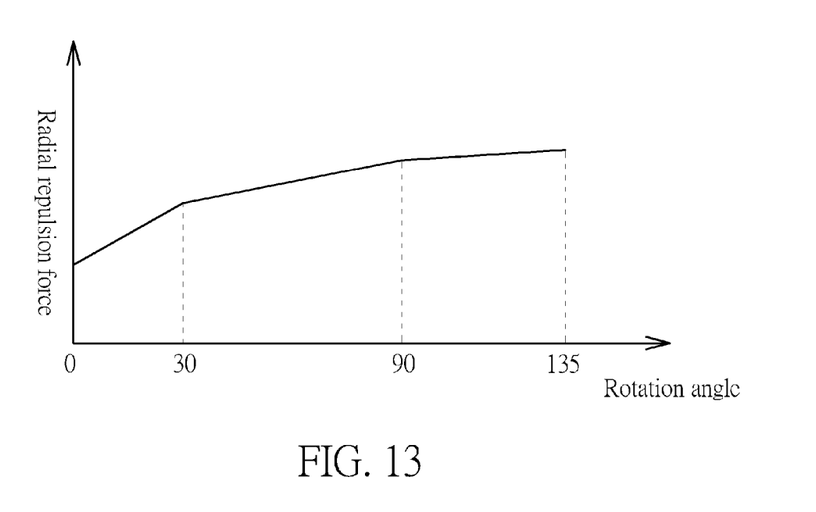
FIG. 13 is a schematic graph of the radial repulsion force of the hinge varying with the rotation angle of the hinge.

Please refer to FIGS. 4, 6 and 7. As a whole, when the first casing 10 and the second casing 12 rotate relatively from the folded state (as shown by FIG. 8) to the unfolded state (as shown by FIG. 1 and FIG. 11),' the second end 158b of the guided rod 158 slides in every segment 1466a, 1466b and 1466c. The adjustment part 152 is driven to urge the second magnetic part 154 to move toward the first magnetic part 148, so that the distance between the second magnetic part 154 and the first magnetic part 148 is shortened gradually substantially, and the radial repulsion force between the second magnetic part 154 and the first magnetic part 148 is increased gradually substantially. The repulsive moment is also increased gradually substantially. In the embodiment, the radial repulsion force varies with the rotation angle 16 of the first casing 10 and the second casing 12, which is shown by FIG. 13.

When the second end 158b of the guided rod 158 slides in the first segment 1466a, i.e. the first casing 10 and the second casing 12 rotating to be unfolded from the folded state (i.e. the rotation angle 16 being 0 degree) until the rotation angle 16 reaches 30 degrees, the radial repulsion force increases in a certain increment rate; that is, the repulsive moment increases in a constant increment rate. Similarly, when the second end 158b of the guided rod 158 slides in the third segment 1466c, i.e. the first casing 10 and the second casing 12 rotating relatively to be unfolded as the rotation angle 16 is from 30 to 90 degrees, the radial repulsion force also increases in a certain increment rate; that is, the repulsive moment increases in another constant increment rate. When the second end 158b of the guided rod 158 slides in the second segment 1466b, i.e. the first casing 10 and the second casing 12 rotating relatively to be unfolded as the rotation angle 16 is from 90 to 135 degrees, the radial repulsion force still increases in a certain increment rate; that is, the repulsive moment increases in another constant increment rate. The increment rates (i.e. slopes) of the radial repulsion force (or the repulsive moment) corresponding to the first segment 1466a, the second segment 1466b and the third segment 1466c are different to one another. For the first segment 1466a, the initial repulsive moment for resisting rotation can be designed to be as smaller as possible for convenience in rotating the second casing 12 by the user. In another aspect, for avoiding damage caused by the second casing 12 falling by its weight from the hand of the user to impact the first casing 10, after the rotation angle 16 reaches a predetermined angle, the hinge 14 needs to be capable of providing enough repulsive moment. So in the rotation range, i.e. corresponding to the first segment 1466a, the increment rate of the radial repulsion force is relatively larger; that is, the increment rate of the repulsive moment is relatively larger. In the embodiment, the predetermined angle is designed to be the rotation angle 16 corresponding to the connection of the first segment 1466a and the third segment 1466c, i.e. 30 degrees, but the invention is not limited thereto. In practice, the predetermined angle can be designed variously in accordance with requirements of various products; in principle, the predetermined angle can be designed to be from 0 to 30 degrees.

When the second end 158b of the guided rod 158 slides from the first segment 1466a into the third segment 1466c, because the burden to the hinge 14 by the weight of the second casing 12 decreases gradually, the increment rate of the radial repulsion force (or the repulsive moment) corresponding to the third segment 1466c can be smaller than the increment rate corresponding to the first segment 1466a. In general, the rotation angle 16 usually reaches over 90 degrees when the foldable electronic apparatus 1 is in use. In this moment, the burden to the hinge 14 by the weight of the second casing 12 will increase gradually again. Furthermore, if the foldable electronic apparatus 1 provides touch function, the second casing 12 will suffer pushing by fingers or other external objects when the touch function is enabled. Therefore, in this embodiment, when the rotation angle 16 reaches over 90 degrees, the radial repulsion force still increases; that is, the repulsive moment increases accordingly. When the rotation angle 16 of the first casing 10 and the second casing 12 reaches 90 degrees, the second end 158b of the guided rod 158 enters the second segment 1466b from the third segment 1466c. As shown in FIG. 13, the increment rate of the radial repulsion force (or the repulsive moment) corresponding to the second segment 1466b is relatively smaller than the increment rate of the radial repulsion force corresponding to the third segment 1466c. When the second end 158b of the guided rod 158 slides in the second segment 1466b until the rotation angle 16 of the first casing 10 and the second casing 12 reaches a predetermined angle, the first casing 10 and the second casing 12 are at the unfolded state to be in use for the user. The predetermined angle is designed to be the rotation angle 16 corresponding to an end of the second segment 1466b, i.e. 135 degrees; however, the invention is not limited thereto. In practice, the predetermined angle can be designed variously in accordance with requirements of various products; in principle, the predetermined angle can be designed to be from 90 to 135 degrees.

Please refer to FIGS. 2, 9 and 11. It is added that the increment rate of the radial repulsion force (or the repulsive moment) corresponding to each segment 1466a, 1466b and 1466c can be observed by the included angle between the axial direction 144b and the extension direction of each segment 1466a, 1466b and 1466c. In the embodiment, the included angles 1468a, 1468b and 1468c between the axial direction 144b and the extension direction 1467a, 1467b and 1467c of the segments 1466a, 1466b and 1466c respectively are different to one another. Therein, the included angle 1468a between the axial direction 144b and the extension direction 1467a of the first segment 1466a (referring to FIG. 9) is smaller than the included angle 1468b between the axial direction 144b and the extension direction 1467b of the second segment 1466b (referring to FIG. 2); the included angle 1468c between the axial direction 144b and the extension direction 1467c of the third segment 1466c (referring to FIG. 11) is between the above included angle 1468a and 1468b. In addition, in the embodiment, the guiding slot 1466 has three segments 1466a, 1466b and 1466c, so when the first casing 10 and the second casing 12 rotate relatively to be unfolded from the folded state to the unfolded state, the second end 158b of the guided rod 158 slides from the first segment 1466a through the third segment 1466c to the second segment 1466b. In practice, if the guiding slot 1466 has only two segments, for example by removing the third segment 1466c and extending and connecting the first segment 1466a and the second segment 1466b, when the first casing 10 and the second casing 12 rotate relatively to be unfolded from the folded state to the unfolded state, the second end 158b of the guided rod 158 slides from the first segment 1466a to the second segment 1466b.

Figure 14:
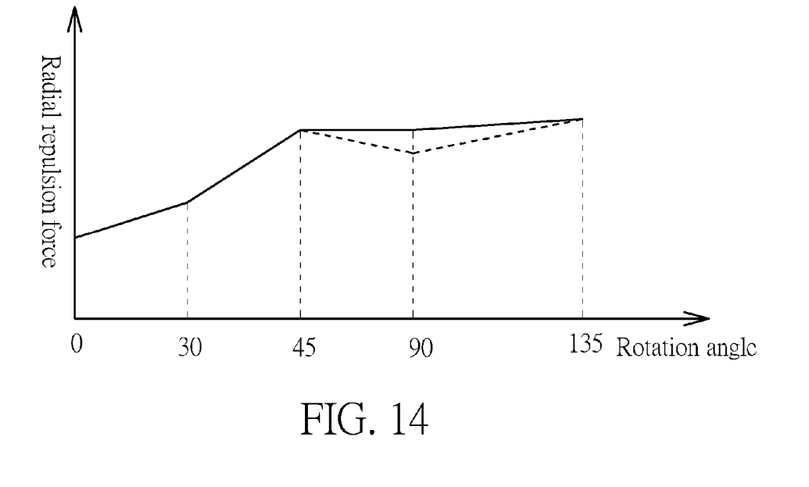
FIG. 14 is a schematic graph of the radial repulsion force of the hinge varying with the rotation angle of the hinge according to another embodiment.

Similarly, in practice, the guiding slot 1466 can be provided with more segments. For example, an embodiment shown by FIG. 14 is carried out by two segments. Therein, when the rotation angle 16 is from 45 to 90 degrees, the increment rate of the radial repulsion force is zero. Furthermore, in the above embodiment, during the rotation of the first casing 10 and the second casing 12 from the folded state to the unfolded state, the increment rates of the radial repulsion force (or the repulsive moment) are non-negative; however, the invention is not limited thereto. In practice, when the rotation angle 16 reaches close to 90 degrees, the radial repulsion force between the second magnetic part 154 and the first magnetic part 148 corresponding to 90 degrees can be slightly lower than the radial repulsion forces corresponding to neighboring angles to the angle of 90 degrees. For example, as shown by the dashed lines in FIG. 14, when the rotation angle 16 is from 45 to 90 degrees, the increment rate of the radial repulsion force can be negative; when the rotation angle 16 is form 90 to 135 degrees, the increment rate of the radial repulsion force can vary in a relatively large increment rate. In addition, in the above embodiments, the variation of the radial repulsion force to the rotation angle 16 is described only to 135 degrees, but the invention is limited thereto. As shown by FIG. 2 and FIG. 7, the guiding slot 1466 still extends after the second segment 1466b, and the radial repulsion force (or the repulsive moment) gradually increases as the first casing 10 and the second casing 12 are continuously unfolded (e.g. the rotation angle 16 being larger than 135 degrees). It is added that in the above embodiments, the radial repulsion force (or the repulsive moment) corresponding to each segment varies linearly for simple illustration; however, the invention is not limited thereto. In practice, the extension profile of the guiding slot 1466 can be designed variously in accordance with requirements to moment variation of various products. For example, the guiding slot 1466 can be provided with a curved or waved extension profile on the outer circumferential surface 1464.

Figure 15:
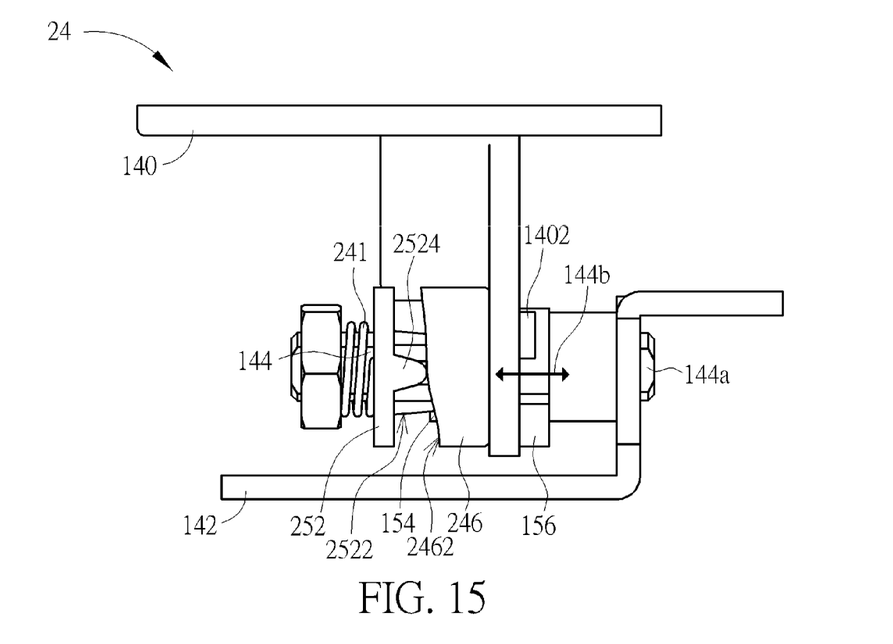
FIG. 15 is a schematic diagram illustrating a hinge according to another embodiment.

In the above embodiments, the hinge 14 uses a guiding mechanism (e.g. by the guiding slot 1466 and the guided rod 158) to dynamically adjust the movement of the adjustment part 152 relative to the first magnetic part 148, so that the radial repulsion force (or the repulsive moment) dynamically varies with the rotation angle 16; however, the invention is not limited thereto. Please refer to FIG. 15, which is a schematic diagram illustrating a hinge 24 according to another embodiment. In the embodiment, the hinge 24 and the hinge 14 are substantially the same in structure, so in principle the hinge 24 is illustrated by using the notations for the hinge 14. Other description of the hinge 24 can refer to the relevant description of the hinge 14, which will not be described in addition. The difference between the hinge 24 and the hinge 14 is mainly on the fact that the guiding mechanism used by the hinge 24 carries out the dynamic movement of the adjustment part 252 of the hinge 24 relative to the socket 246 of the hinge 24 (i.e. relative to the first magnetic part 148, which is not shown in FIG. 15) by use of cam operation principle. The socket 246 of the hinge 24 has a cam surface 2462. The cam surface 2462 surrounds the axial direction 144b and varies in the axial direction 144b. The adjustment part 252 of the hinge 24 has a follower 2524 slidably contacting the cam surface 2462. In practice, for the preservation of the follower 2524 contacting the cam surface 2462, the hinge 24 can include a spring 241 urging against the adjustment part 252. Thereby, when the second connection member 142 rotates relative to the first connection member 140, the second connection member 142 drives the adjustment part 252 to rotate relative to the socket 246, and the follower 2524 slides on the cam surface 2462 in the axial direction 144b to guide the adjustment part 252 to move in the axial direction 144b relative to the socket 246 (i.e. relative to the first magnetic part 148) so as to push and move the second magnetic part 154 by the oblique surface 2522. It also can perform the adjustment in the distance between the second magnetic part 154 and the first magnetic part 148; that is, both the radial repulsion force and the repulsion moment resisting rotation are adjusted. It is added that in practice, the cam surface 2462 and the follower 2524 can be disposed reversely; that is, the cam surface 2462 is disposed on the adjustment part 252 while the follower 2524 is disposed on the socket 246. For this case, the description of the operation thereof is similar to the above description and will not be repeated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hinge, comprising:
    a first connection member;
    a second connection member;
    a pivot, the first connection member and the second connection member being pivotally connected by the pivot;
    a first magnetic part connected onto the first connection member, the first magnetic part producing a radial magnetic field relative to the pivot;
    a second magnetic part moveably disposed relative to the first magnetic part and kinetically connected to the second connection member, a magnetic moment of the second magnetic part being opposite to a magnetic moment of the first magnetic part;
    an adjustment part kinetically connected to the second connection member and capable of driving the second magnetic part; and
    a guiding mechanism, kinetically connected to the first connection member and the adjustment part, for guiding the adjustment part to move in an axial direction of the pivot relative to the first magnetic part when the second connection member rotates relative to the first connection member;
    wherein when the second connection member rotates relative to the first connection member, the second connection member drives the second magnetic part by the adjustment part to rotate relative to the first magnetic part, so that a repulsive moment is induced between the first magnetic part and the second magnetic part for resisting the rotating of the second connection member relative to the first connection member, and the second connection member also drives the adjustment part to adjust a distance between the second magnetic part and the first magnetic part so as to vary the repulsive moment.

2. The hinge of claim 1, wherein the second connection member is engaged with the pivot, the adjustment part is sleeved on the pivot so as to be capable of rotating together with the pivot and the second connection member relative to the first connection member.

3. The hinge of claim 1, wherein the adjustment part has an oblique surface substantially extending in an axial direction of the pivot, the second magnetic part urges against the oblique surface, and when the second connection member drives the adjustment part to move in the axial direction relative to the first magnetic part, the second magnetic part slides on the oblique surface relative to the adjustment part.

4. The hinge of claim 3, further comprising a guiding part kinetically connected to the second connection member, the guiding part having a sliding slot, the sliding slot extending perpendicular to the axial direction, the second magnetic part being moveably disposed in the sliding slot, wherein when the second connection member rotates relative the first connection member, the second connection member drives the guiding part and the second magnetic part to rotate together relative to the first magnetic part.

5. The hinge of claim 4, wherein the second connection member is engaged with the pivot, and the guiding part and the adjustment part are sleeved on the pivot so as to be capable of rotating together with the pivot and the second connection member relative to the first connection member.

6. The hinge of claim 1, further comprising a socket disposed on the first connection member, the socket having a recess, the first magnetic part being disposed on an inner sidewall of the recess.

7. The hinge of claim 6, wherein the socket has an outer circumferential surface and a guiding slot formed on the outer circumferential surface, the guiding slot extends surrounding an axial direction of the pivot, the hinge further comprises a guided rod, a first end of the guided rod is connected to the adjustment part, a second end of the guided rod is slidably disposed in the guiding slot, the guiding mechanism comprises the guiding slot and the guided rod, and when the second connection member rotates relative to the first connection member, the second connection member drives the adjustment part to rotate relative to the socket, and the second end slides in the guiding slot to guide the adjustment part move in the axial direction relative to the first magnetic part.

8. The hinge of claim 7, wherein the guiding slot has a first segment and a second segment, and an included angle between an extension direction of the first segment and the axial direction is different to an included angle between an extension direction of the second segment and the axial direction.

9. The hinge of claim 6, wherein one of the socket and the adjustment part has a cam surface, the other of the socket and the adjustment part has a follower slidably contact the cam surface, the cam surface extends surrounding an axial direction of the pivot and varies in the axial direction, the guiding mechanism comprises the cam surface and the follower, and when the second connection member rotates relative to the first connection member, the second connection member drives the adjustment part to rotate relative to the socket, and the follower slides on the cam surface in the axial direction to guide the adjustment part to move in the axial direction relative to the first magnetic part.

10. A foldable electronic apparatus, comprising:
    a first casing;
    a second casing; and
    a hinge, the first casing and the second casing being pivotally connected by the hinge, the hinge comprising:
        a first connection member connected to the first casing;
        a second connection member connected to the second casing;
        a pivot, the first connection member and the second connection member being pivotally connected by the pivot so that the first casing and the second casing is capable of rotating relatively to be folded or unfolded;
        a first magnetic part connected onto the first connection member, the first magnetic part producing a radial magnetic field relative to the pivot;
        a second magnetic part moveably disposed relative to the first magnetic part and kinetically connected to the second connection member, a magnetic moment of the second magnetic part being opposite to a magnetic moment of the first magnetic part;

an adjustment part kinetically connected to the second connection member and capable of driving the second magnetic part; and a guiding mechanism, kinetically connected to the first connection member and the adjustment part, for guiding the adjustment part to move in an axial direction of the pivot relative to the first magnetic part when the second connection member rotates relative to the first connection member;

wherein when the second connection member rotates relative to the first connection member, the second connection member drives the second magnetic part by the adjustment part to rotate relative to the first magnetic part, so that a repulsive moment is induced between the first magnetic part and the second magnetic part for resisting the rotating of the second connection member relative to the first connection member, and the second connection member also drives the adjustment part to adjust a distance between the second magnetic part and the first magnetic part so as to vary the repulsive moment;

wherein when the first casing and the second casing rotate relatively from a folded state to unfold to an unfolded, the repulsive moment increases overall.

11. The foldable electronic apparatus of claim 10, wherein the adjustment part has an oblique surface substantially extending in an axial direction of the pivot, the second magnetic part urges against the oblique surface, and when the second connection member drives the adjustment part to move in the axial direction relative to the first magnetic part, the second magnetic part slides on the oblique surface relative to the adjustment part.

12. The foldable electronic apparatus of claim 11, wherein the hinge further comprises a guiding part kinetically connected to the second connection member, the guiding part has a sliding slot, the sliding slot extends perpendicular to the axial direction, the second magnetic part is moveably disposed in the sliding slot, and when the second connection member rotates relative the first connection member, the second connection member drives the guiding part and the second magnetic part to rotate together relative to the first magnetic part.

13. The foldable electronic apparatus of claim 12, wherein the second connection member is engaged with the pivot, and the guiding part and the adjustment part are sleeved on the pivot so as to be capable of rotating together with the pivot and the second connection member relative to the first connection member.

14. The foldable electronic apparatus of claim 10, wherein the hinge further comprises a socket disposed on the first connection member, the socket has a recess, and the first magnetic part is disposed on an inner sidewall of the recess.

15. The foldable electronic apparatus of claim 14, wherein the socket has an outer circumferential surface and a guiding slot formed on the outer circumferential surface, the guiding slot extends surrounding an axial direction of the pivot, the hinge further comprises a guided rod, a first end of the guided rod is connected to the adjustment part, a second end of the guided rod is slidably disposed in the guiding slot, the guiding mechanism comprises the guiding slot and the guided rod, and when the second connection member rotates relative to the first connection member, the second connection member drives the adjustment part to rotate relative to the socket, and the second end slides in the guiding slot to guide the adjustment part move in the axial direction relative to the first magnetic part.

16. The foldable electronic apparatus of claim 15, wherein the guiding slot has a first segment and a second segment, a first included angle between an extension direction of the first segment and the axial direction is different to a second included angle between an extension direction of the second segment and the axial direction, and when the first casing and the second casing rotate relatively from the folded state to unfold to the unfolded, the second end slides from the first segment to the second segment.

17. The foldable electronic apparatus of claim 16, wherein the first included angle is smaller than the second included angle.

18. The foldable electronic apparatus of claim 17, wherein when the second end slides in the first segment, the first casing and the second casing are capable of rotating relatively from the folded state to a first rotation angle, and when the second end slides in the second segment, the first casing and the second casing are capable of rotating relatively to a second rotation angle.

19. The foldable electronic apparatus of claim 18, wherein the first rotation angle is between 0 to 30 degrees, and the second rotation angle is between 90 to 135 degrees.

20. The foldable electronic apparatus of claim 17, wherein the guiding slot further has a third segment between the first segment and the second segment, a third included angle between an extension direction of the third segment and the axial direction is between the first included angle and the second included angle, and when the first casing and the second casing rotate relatively from the folded state to unfold to the unfolded, the second end slides from the first segment through the third segment to the second segment.

* * * * *